(12) United States Patent
Hughes

(10) Patent No.: US 6,480,953 B1
(45) Date of Patent: Nov. 12, 2002

(54) METHOD AND APPARATUS FOR ENSURING SYSTEM CONFIGURATION DATA STRUCTURE COHERENCY ACROSS MULTIPLE CONTROLLERS IN A DATA STORAGE SYSTEM

(75) Inventor: Joseph Paul Hughes, Boulder, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/460,305

(22) Filed: Dec. 13, 1999

(51) Int. Cl.[7] .......................................... G06F 15/177
(52) U.S. Cl. ................. 713/1; 713/100; 714/7
(58) Field of Search ................. 713/1, 2, 100; 714/2, 3, 7

(56) References Cited

U.S. PATENT DOCUMENTS 6,073,218 A * 6/2000 DeKoning et al. .......... 711/150
6,105,085 A * 8/2000 Farley ......................... 710/41
6,247,099 B1 * 6/2001 Skazinski et al. ........... 711/141
6,253,240 B1 * 6/2001 Axberg et al. .............. 709/223

* cited by examiner

Primary Examiner—Dennis M. Butler

(57) ABSTRACT

The present invention ensures system configuration data structure coherency across multiple controllers in a data storage system. To accomplish this, a controller that detects any change in the system configuration of the data storage system, must first reserve a predetermined device before it can modify its own system configuration data structure, and before it can notify any other controllers of the change, such that they can modify their respective system configuration data structures. After such modifications the detecting controller will release the reservation of the predetermined device. In this manner, updates to each respective controller's system configuration data structure are synchronized, ensuring system configuration data structure coherency across multiple controllers in the data storage system.

26 Claims, 5 Drawing Sheets

METHOD AND APPARATUS FOR ENSURING SYSTEM CONFIGURATION DATA STRUCTURE COHERENCY ACROSS MULTIPLE CONTROLLERS IN A DATA STORAGE SYSTEM

FIELD OF THE INVENTION

This invention relates generally to data storage systems. More particularly, the invention relates to a system, structure, and method for ensuring that a controller in a data storage system that is managed by multiple controllers, has an accurate representation of the system configuration of the data storage system.

BACKGROUND OF THE INVENTION

Disk drives in all computer systems are susceptible to failures caused, for example, by temperature variations, head crashes, motor failure, controller failure, and changing supply voltage conditions. Modern computer systems typically require, or at least benefit from, a fault-tolerant data storage system, for protecting data in the data storage system against any instances of disk drive failure. One approach to meeting this need is to provide a redundant array of independent disks (RAID).

RAID is a known data storage technology, operated by a disk array controller (controller), that uses several magnetic or optical disk storage devices, known as a disk array, working in tandem to increase disk capacity, improve data transfer rates, and provide higher data storage system reliability in the event of one or more disk storage device failures. However, not only is it desirable for a data storage system to reliably function in the instance that one or more disk storage device failures occur, it is also desirable for the data storage system to reliably function with any type of failed component, including a failed controller. For example, if a controller fails in a single controller system, the entire RAID becomes inoperable. Additionally, although failure of a single controller in RAID being managed by multiple independent controllers (such a RAID system is not shown) will not typically render the entire RAID system inoperable, such a failure will render the tasks that were being performed by the failed controller, and/or those tasks scheduled to be performed by the failed controller, inoperable.

To circumvent the system level reliability problem that all conventional single and multiple independent controller data storage systems exhibit, and to provide fault tolerance to a data storage system at a controller level, data storage systems managed by two controllers in dual active configuration were implemented.

Referring to FIG. 1, there is shown data storage system 124 being managed by two controllers, controllers 126 and 128, in dual active configuration, according to a state-of-the-art. Controller 126–128 manage the RAID, and upon detecting that the other controller 126–128 has failed, will take over the tasks that were being performed by the failed controller 126–128, and perform those tasks that were scheduled to be performed by the failed controller 126–128. In this manner, data storage system 124 provides fault-tolerance at a controller level. The RAID in this example is the disk drive array in peripheral 140, that includes, for example disk drives 134–138.

Controllers 126 and 128 are coupled across first peripheral bus 132, for example, an optical fiber, copper coax cable, or twisted pair (wire) bus, to a plurality of storage devices, for example, disk drives 134–138, in peripheral 140. Controllers 126 and 128 are also coupled across second peripheral bus 142, for example, an optical fiber, copper coax cable, or twisted pair (wire) bus, to one or more host computers, for example, host computer 144.

A first processor (not shown) in controller 126 is coupled to memory 146 that is either internal or external to controller 126. Controller 126 maintains in memory 146, a system configuration data structure 150-X and a conventional system configuration update procedure (not shown) that is executable by the first processor. Similarly, a second processor (not shown) in controller 128 is coupled to memory 148 that is either internal or external to controller 128. Controller 128 maintains in memory 148, a system configuration data structure 152-X and a conventional system configuration update procedure (not shown) that is executable by the second processor.

Each respective controller 126–128 has only one respective system configuration data structure 150-X. For example, controller's 126 system configuration data structure 150-X is illustrated respectively as 150-A and 150-B, only to reflect certain content changes that occur over time in controller's 126 system configuration data structure 150-X due to the operation of the conventional system configuration update procedure that is discussed in greater detail below. Similarly, controller's 128 system configuration data structure 150-X is illustrated respectively as 150-C and 150-D, only to reflect certain content changes that occur over time in controller's 128 system configuration data structure 150-X due to the operation of the conventional system configuration update procedure.

Each respective system configuration data structure 150-X represents aspects of the system configuration of data storage system 124 ("system 124"). Such aspects include, for example, information with respect to the status, structure and relationship of one or more respective components of system 124 with respect to other respective components of system 124.

Such structural information includes, for example, an indication of whether a particular component is a disk storage device 134–138, or a controller 126–128. Such relationship information includes, for example, an indication that a controller 126–128 can communicate with a component over a particular I/O bus, such as, for example, I/O bus 132. Such status information includes, for example, an indication of whether or not a disk storage device 134–138 is active, and therefore, able to process I/O requests from the controller 126–128, or whether a disk storage device 134–138 has failed, and thus, unable to process I/O requests from the controller 126–128. (Such I/O requests include, for example, Small Computer Standard Interface (SCSI) read and write data requests, which are known in the art of computer programming).

Note that system configuration 150-A accurately represents the respective operational status of each disk drives 134–138. Each disk drive 134–138 is illustrated as "DISK DRIVE NO. (STATUS)", for example, DISK DRIVE 134 (ACTIVE)", and the like. In particular, system configuration data structure 150-A accurately represents that disk drive 134 has an active status, and accurately represents that disk drives 136–138 each have a respective failed status.

Data storage system's 124 system configuration (component content (structure), statuses and relationships) can change for any one of a number of reasons. For example, a system configuration can change as a result of: (a) the failure, or malfunction of a disk drive 134–138; (b) the removal or replacement of a disk drive 134–138 in the event that the disk drive 134–138 failed, or was upgraded; and, (c) the moving a particular disk drive 134–138 to a different location in data storage system 124, such that a different I/O bus 132 is used to communicate with the particular disk drive 134–138.

Upon identifying, by a particular controller 126–128, a change in the system configuration of the data storage system 124, the particular controller 126–128 updates its respective system configuration 150-X to reflect the change. (Methods of identifying changes in the system configuration of a data storage system are known in the art of computer programming). Because it is common for a particular controller 126–128 to detect a system configuration change of data storage system 124 without another different controller 126–128 detecting the same change, the particular controller 126–128, upon detecting any such changes, notify each of the other different controllers 126–128 of the change in the system configuration. Upon receipt of such a notification, each of the receiving controllers 126–128 will update their respective system configuration data structure 150-X to reflect the change.

To accomplish such a notification, controller 126 is coupled across cable 130, for example, a fiber optic, copper coax cable, or twisted pair (wire), to controller 128. Cable 130 is used by each respective controller 126 and 128 to perform a number of tasks, including, for example: (a) upon detecting a change in data storage system's 124 system configuration, to send system configuration updates to the other controller 126–128; and (b) to determine if the other controller 126–128 has failed.

It can be appreciated that for the proper functioning of data storage system 124, it is desirable for each controller's 126–128 system configuration data structure 150-X to accurately represent, the structure, component relationships, and operational statuses of any components (system configuration) of the data storage system 124. Unfortunately, there is a significant problem with such conventional system configuration data structure 150-X update techniques, because controllers 126–128, upon performing such techniques in an unsynchronized manner, can each end up with a respective system configuration data structure 150-X that does not accurately represent the system configuration of data storage system 124.

Consider the following example, where disk drives 136 and 138 fail (or are taken offline), and disk drive 134 is active, or online. In this example, controller 126, detects that disk drive 138 has failed, not yet detecting that disk drive 136 has also failed. Controller 126, in response to detecting the failure of disk drive 138, updates its respective system configuration data structure 150-X, as illustrated in 150-B, to reflect the failure of disk drive 138. At approximately the same time, controller 128, detects that disk drive 136 has failed, not yet detecting that disk drive 138 has also failed. In response to detecting the failure of disk drive 136, controller 128 updates its respective system configuration data structure 150-X, as illustrated in 150-C, to reflect the failure of disk drive 136.

In this example, according to the state of the art, controller 126 sends to controller 128 a system configuration update notification (not shown) that includes an indication that disk drive 138 has failed (true), that disk drive 134 is active (true), and that disk drive 136 is active (false). Upon receipt, by controller 128, of the system configuration update notification, controller 128 modifies system configuration 150-X, as illustrated in 150-D, to reflect that disk drive 138 has failed (true) and that disk drives 134 and 136 are active (false).

Such a result occurs because controller 128 erroneously assumes, according to the state of the art, that the system configuration update notification received from controller 126, received after controller 128 has updated system configuration 150-X, supercedes its old information (illustrated in 150-C). Thus, system configuration 150-X will lose the failed status for drive 136, illustrated in 150-C, and will instead reflect an erroneous status of data storage system's 124 system configuration, illustrated in 150-D. Additionally, controller 126 never learns that disk drive 136 has failed, as illustrated in system configuration 150. Therefore, neither system configuration 150 or 150-X accurately reflects the system configuration of data storage system 124.

Therefore, what is needed, is a system, structure and method for ensuring system configuration data structure 150-X coherency across multiple disk array controllers 126–128 in a data storage system 124, such that any modifications to such system configuration data structures do not lead to inaccurate representations of the system configuration of the data storage system 124.

BRIEF DESCRIPTION OF THE DRAWINGS

For a better understanding of the nature and advantages of the invention, reference should be made to the following detailed description taken in conjunction with the accompanying drawings, in which.

SUMMARY OF THE INVENTION

Heretofore, unsynchronized modification by a controller to its respective system configuration data structure may result in corrupting the integrity of the system configuration data structure. The present invention provides a solution to this significant problem with the state of the art.

In one aspect, the method of the present invention ensures system configuration data structure coherency across multiple controllers in a data storage system. To accomplish this, first, a controller upon detecting a change in the system configuration of the data storage system, will reserve a predetermined device, such that the predetermined device once reserved cannot be reserved by any other controller, and such that updates to any one controller's respective system configuration data structure can only be made if the predetermined device is reserved. Next, the controller will modify its respective system configuration data structure to include the change. Next, the controller will notify at least one other controller of the change. In response to receiving such a notification, a different controller will update its respective system configuration data structure. In this manner, updates to each respective controller's system configuration data structure are synchronized, ensuring system configuration data structure coherency across multiple controllers in the data storage system.

DETAILED DESCRIPTION OF EMBODIMENTS OF THE INVENTION

The invention will now be described in detail by way of illustrations and examples for purposes of clarity and understanding. It will be readily apparent to those of ordinary skill in the art in light of the teachings of this invention that certain changes and modifications may be made thereto without departing from the spirit or scope of the appended claims. Section headings are provided for convenience and are not to be construed as limiting the disclosure, as all various aspects of the invention are described in the several sections.

A. System Level Architectural Description

Figure 1:
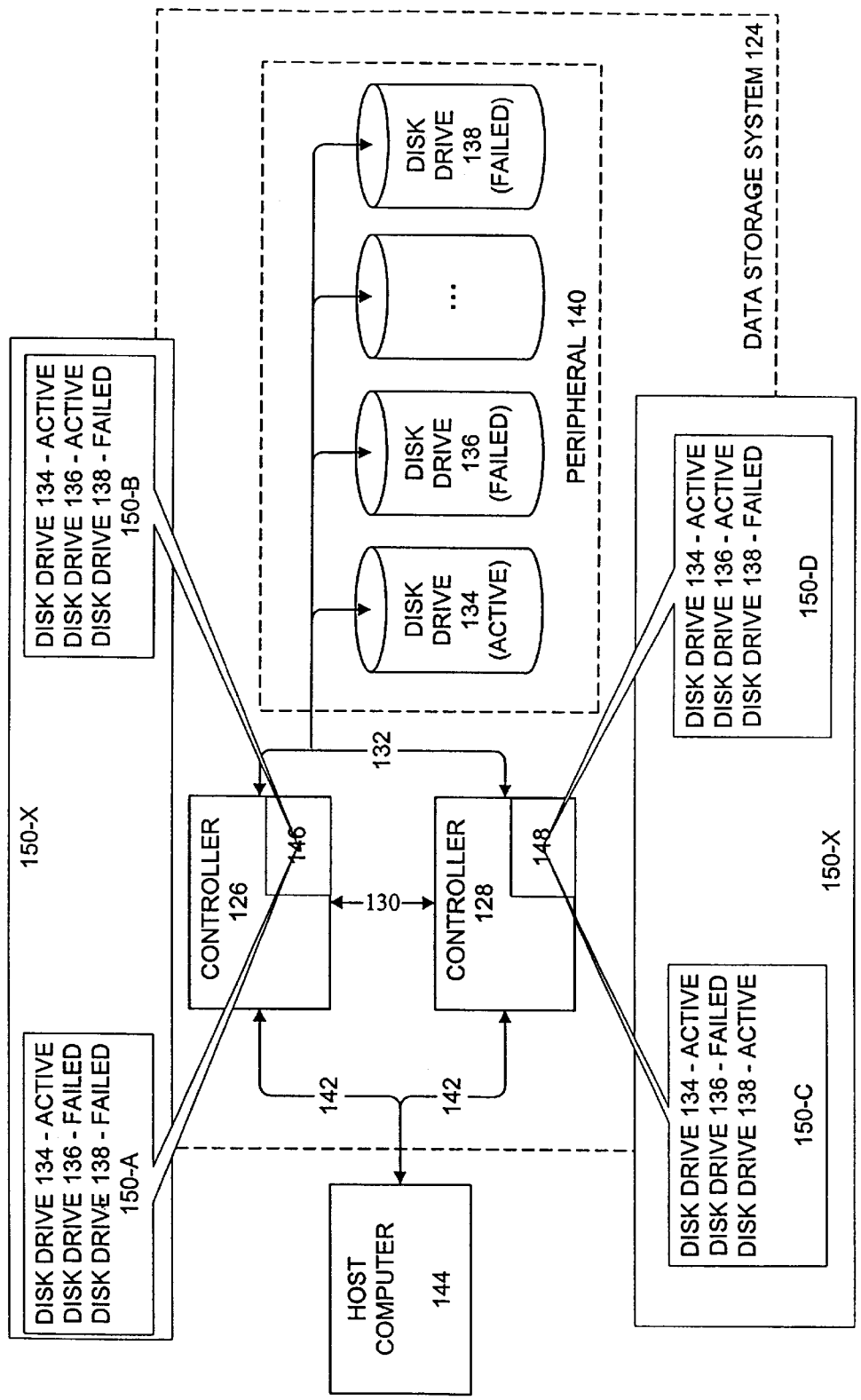
FIG. 1 is a block diagram illustrating aspects of a conventional data storage system, according to state-of-the-art.
Figure 2:
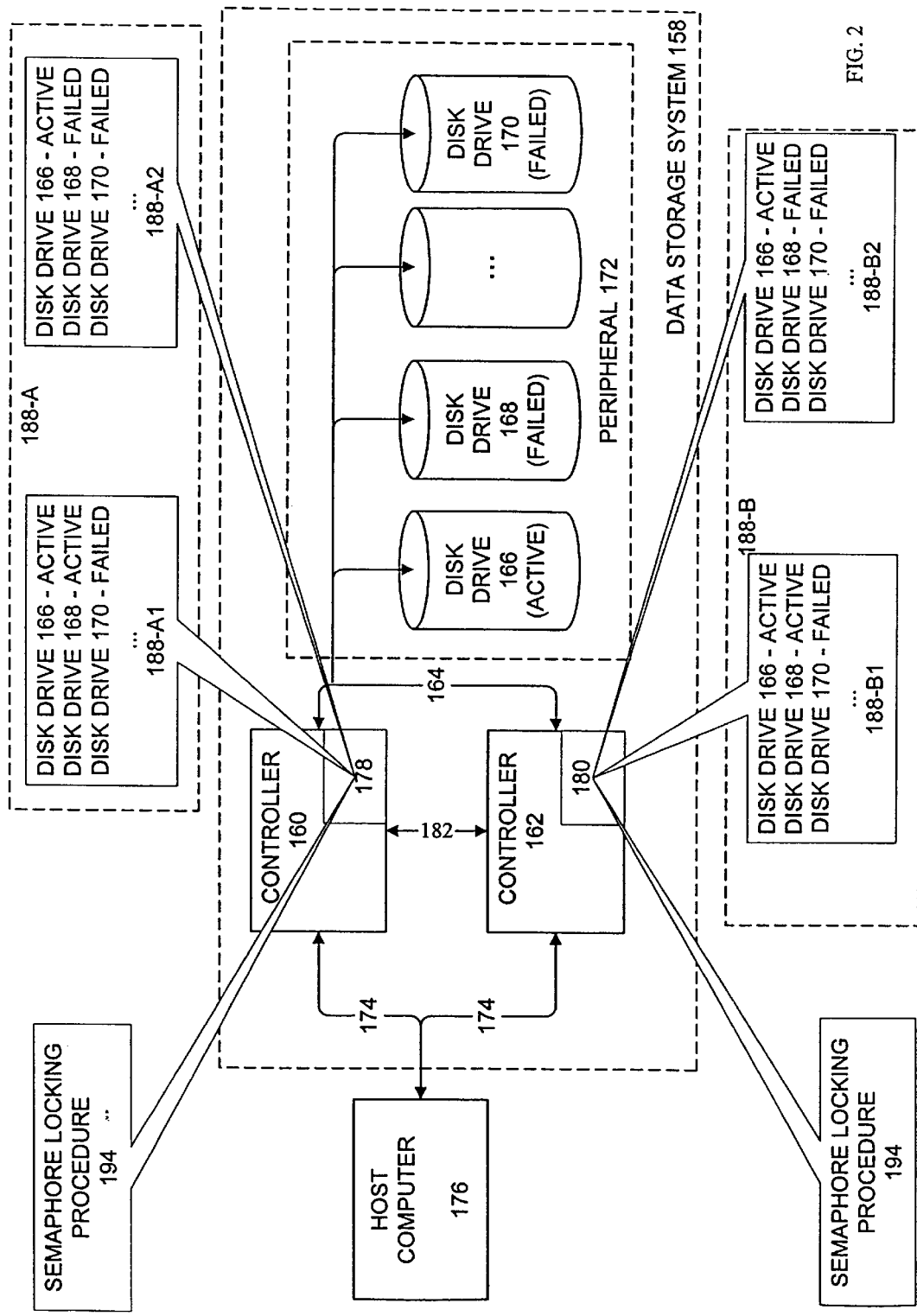
FIG. 2 is a block diagram illustrating aspects of an exemplary data storage system, according to one embodiment of the present invention.

Referring to FIG. 2, there is shown an exemplary data storage system 158, according to one embodiment of the present invention. In contrast to what conventional data storage systems 124 allow (see FIG. 1), any modification by a particular controller 160–162 to a respective system configuration data structure 188-B1 is synchronized with any other modification by another controller 160–162 to its respective system configuration data structure 188-X, such that each controller's 160–162 respective representation 188-X will accurately represent the system configuration of data storage system 158.

Controllers 160 and 162 are coupled across first peripheral bus 164, for example, an optical fiber, copper coax cable, or twisted pair (wire) bus, to a plurality of storage devices, for example, disk drives 166–170, in peripheral 172. Controllers 160 and 162 are also coupled across second peripheral bus 174, for example, an optical fiber, copper coax cable, or twisted pair (wire) bus, to one or more host computers, for example, host computer 176.

Controller 160 is coupled across cable 182, for example, a fiber optic, copper coax cable, or twisted pair (wire), to controller 162 Cable 130 is used by each respective controller 160 and 162 to perform a number of tasks, including, for example: (a) upon detecting a change in the system configuration of data storage system 158, to send system configuration updates to the other controller 160–162; and (b) to determine if the other controller 160–162 has failed.

Each respective controller 160–162 has only one respective system configuration data structure 188-X. For example, controller's 160 system configuration data structure 188-A is illustrated respectively as 188-A1 and 188-A2, only to reflect certain content changes that occur over time in controller's 160 system configuration data structure 188-A due to the operation of a novel semaphore locking procedure 194 that is discussed in greater detail below in reference to FIG. 3. Similarly, controller's 162 system configuration data structure 188-B is illustrated respectively as 150-C and 150-D, only to reflect certain content changes that occur over time in controller's 162 system configuration data structure 188-B due to the operation of the novel semaphore locking procedure 194.

Each controller 160–162 is coupled to a respective random access memory (RAM) 178–180 that is either internal or external to the respective controller 160–162, wherein is maintained, by each respective controller 160–162, a respective system configuration data structure 188-X, and the novel semaphore locking procedure 194. (RAM 178–180 structure is discussed in greater detail below in reference to FIG. 4, and RAM 238). We now discuss the details of an exemplary semaphore locking procedure 194, according to one embodiment of the present invention.

B. An Exemplary Semaphore Locking Procedure 194 Description

Figure 3:
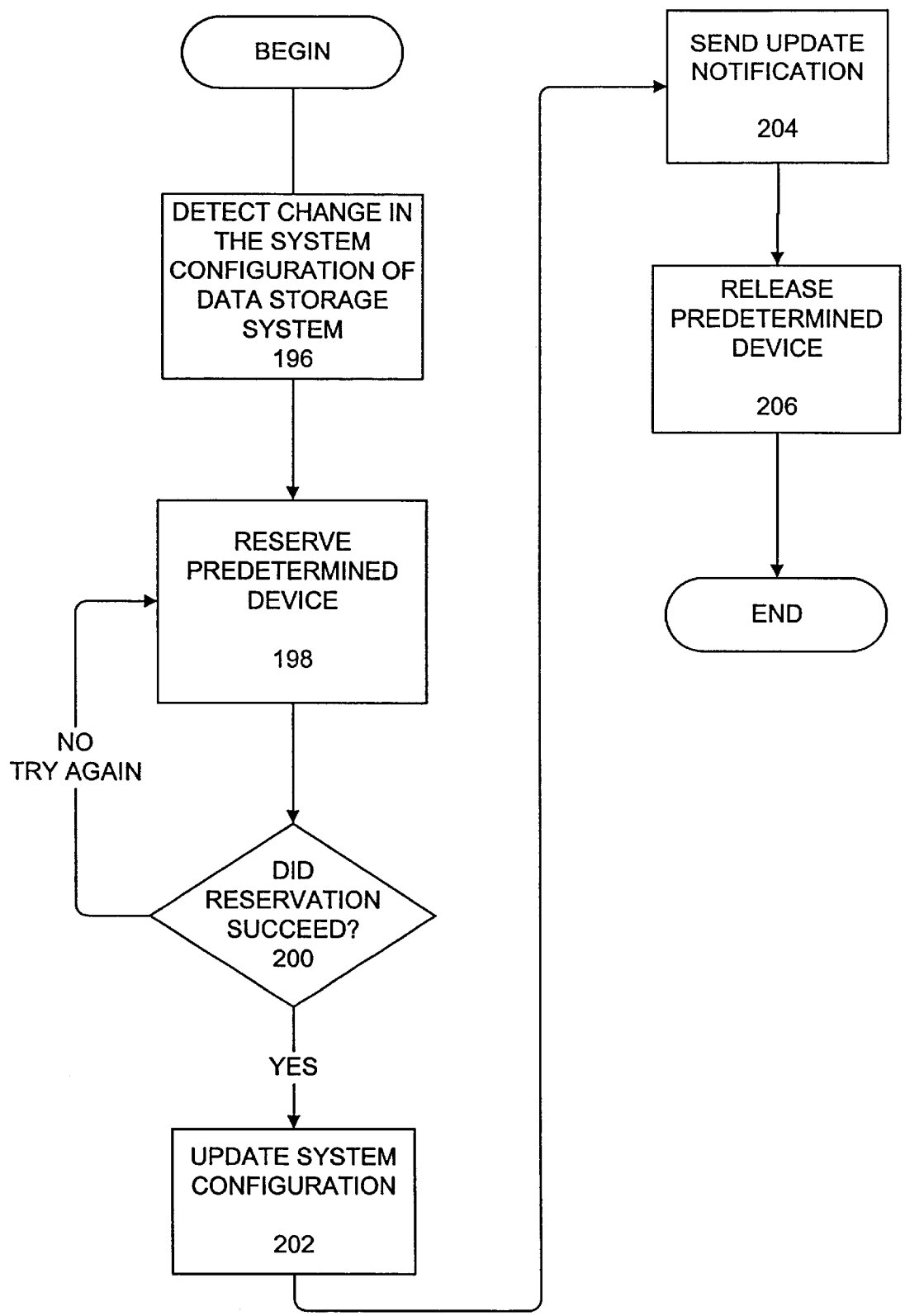
FIG. 3 is a flowchart illustrating aspects of an exemplary semaphore locking procedure, according to one embodiment of the present invention.

Referring to FIG. 3, there is shown a flowchart illustrating aspects of an exemplary semaphore locking procedure 194, according to one embodiment of the present invention. In contrast to the state of the art, where unsynchronized modifications to respective system configuration data structures 150-X can result in erroneous information in the respective system configuration data structures 150-X, the present invention uses semaphore locking procedure 194 to synchronize any such modifications, such that each respective system configuration data structure 188-X contains accurate information. (For purposes of illustration, steps 196–206 of semaphore locking procedure 194 are discussed by way of example in reference to the several components of data storage system 158 as illustrated in FIG. 2.)

Step 196 detects, by a particular controller 160–162, a change in the system configuration of data storage system. (Reasons why the system configuration of the data storage system would change are discussed in greater detail above, and procedures for detecting such system configuration changes by a controller in a data storage system are known).

Step 198 attempts to reserve, by the particular controller 160–162, a predetermined device, for example, either one of disk drives 166–170. In one embodiment, a SCSI reserve command is used to reserve the predetermined device. SCSI reserve commands and procedures for using SCSI reserve commands are known in the art of computer programming. The predetermined device is desirably a hardware resource, for example, either one of disk drives 166–170, that is accessible by each controller in data storage system 158.

The identification of the predetermined device to be reserved can be obtained by a controller 160–162 in a variety of ways, including, for example, by selecting a storage device 166–70 that has the lowest target identification (ID) on the first peripheral bus 164 as the predetermined device. Target ID's are known in the art. Alternatively, a storage device 166–170 having the highest numerical value target ID on the same peripheral bus 164, or on a different peripheral bus 164, can be selected to be the predetermined device.

If, for some reason, a particular storage device 166–170 is not available because, for example, the storage device has failed, then the next active storage device 166–170 may be selected to be the predetermined device. In a preferred embodiment, each controller 160–162 determines the identification of the predetermined device in the same manner.

Step 200 determines, by the particular controller 160–162, whether the attempt to reserve the predetermined device (step 198) was successful. Attempts to reserve the predetermined device will not be successful if another controller 160–162 has already reserved the predetermined device. If the attempt to reserve the predetermined device was not successful (step 198), semaphore locking procedure 194 will continue to attempt to reserve the predetermined device as described in greater detail above, at step 196.

Step 202 modifies, by the particular controller 160–162, its respective system configuration data structure 188-X to reflect the change that was detected (step 196) in the system configuration of the data storage system 158. For example, consider that if controller 160 detected the failure of disk drive 170, system configuration 188-A would be modified as illustrated in system configuration 188-A1, wherein there is shown indications that disk drives 166 and 168 are active, and an indication that disk drive 170 has failed.

Step 204 sends a system configuration data structure 188-X update notification, by the particular controller 160–162, to any other controller 160–162. Such a system configuration data structure 188-X update notification (not shown) is a controller-to-controller message that can be sent across cable 182, or that can be sent across bus 164 in any conventional manner. Such a system configuration data structure 188-X update notification will include an indication of the change in the system configuration of the data storage system 158. Building on the above example, where controller 160 detected that drive 170 had failed, such a system configuration data structure 188-X update notification will include information that disk drive 170 has failed.

A controller 160–162, upon receiving such a notification, will update its respective system configuration data structure 188-X to reflect the change(s) that were detected in the system configuration of the data storage system (step 196). Building on the above example, where controller 160 sent a system configuration data structure 188-X update notification (step 204), if controller 162 receives the notification, controller 162 will update its respective system configuration 188-B as illustrated in system configuration data structure 188-B1. Note that system configuration data structure 188-B1 includes information that disk drives 166 and 168 are active, and an indication that disk drive 170 has failed.

Step 206 releases, by the particular controller 160–162 that reserved the predetermined device, the reservation on the predetermined device. In one embodiment, a SCSI release command is sent to the predetermined device by a controller to release the controllers reservation on the predetermined device. The SCSI release command, as well as procedures for using the SCSI release command, are known in the art of computer programming.

Using the exemplary steps 196–206 described above, if more than one controller 160–162 identifies a change in the system configuration during the same time period, only one of those controllers 160–162 will be able to: (a) modify its respective system configuration 188-X to indicate the change; and (b) notify each of the other controllers of the change. For example, if controller 162 detects the failure of disk drive 168, and controller 160 had already reserve the predetermined device. At step 200, controller's 162 attempt to reserve the predetermined device so that it could update its respective system configuration 188-B will fail.

Eventually, upon release of the predetermined device at step 206 by controller 160, controller's 162 attempt to reserve the predetermined device at step 198 will succeed. At step 202, controller 162 will update system configuration 188-B to indicate the changes that it detected in data storage system 158. In this example, controller 162 will update system configuration 188-B to indicate that it detected the failure of disk drive 168, as illustrated in system configuration 188-B2.

At step 204, controller 162 will send a system configuration update notification to any other controller in data storage system 158, for example, controller 160, wherein there includes an indication of controller's 162 current representation (188-B2) of the system configuration of data storage system 158 Upon receiving such a notification, controller 160 will update its respective system configuration 188-A to reflect the change(s) that were detected by controller 162. In this example, such changes are illustrated in system configuration 188-A2.

At step 206, controller 162 will release its reservation on the predetermined device, such that any other controller upon detecting any changes in the system configuration of data storage system 158 can attempt to reserve the predetermined device and perform the exemplary procedures described above.

In contrast to what conventional procedures allow (discussed in greater detail above in reference to FIG. 1), the inventive exemplary semaphore locking procedure 194 prevents multiple controllers from simultaneously modifying respective system configuration data structures 188-X, and thereby provides each controller 160–162 in a data storage system 158 with an accurate representation of the system configuration, such as that illustrated by respective system configurations 188-A2 and 188-B2.

As can be appreciated from the description of the embodiment of the system (see FIG. 2) and method (see FIG. 3), the present invention can be used in data storage systems having any number of controllers 160–162 greater than or equal to two controllers 160–162. For example, the present invention can be used in data storage systems having 2, 3, 4, 5, 6, 7, 8, or more controllers 160–162. Additionally, the present invention can be used to synchronize modifications to not only system configuration information, but also the present invention can be used to synchronize modifications among a plurality of controllers 160–162 to any data accessed by the controllers 160–162.

C. Exemplary Disk Array Controller Description

Figure 4:
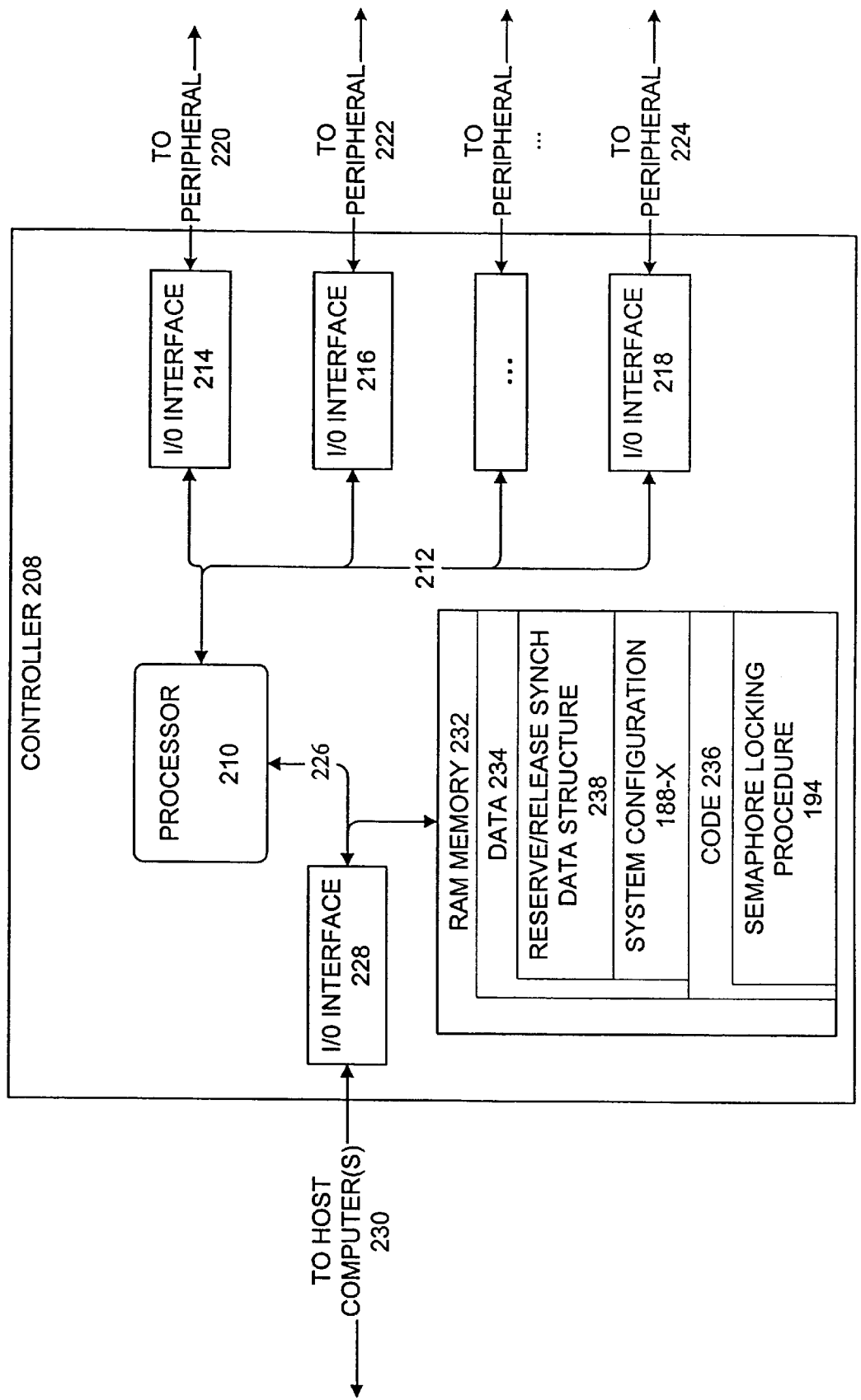
FIG. 4 is a block diagram illustrating exemplary aspects of a disk array controller, according to one embodiment of the present invention; and, FIG. 5 is a block diagram illustrating aspects of an exemplary reserve/release synchronization data structure, according to one embodiment of the present invention.

Referring to FIG. 4, there is shown a block diagram illustrating aspects of exemplary controller 208, according to one embodiment of the present invention. The structure and operation of controller 208 may be used in conjunction with any one or more of controllers 160–162 as illustrated in the embodiments of FIG. 2.

Controller 208 includes processor 210 which is coupled across first local bus 226 to I/O interface 228, for bridging between first local bus 226 and first component bus 230, for example, an optical fiber, copper coax cable, or twisted pair (wire) bus, which is coupled to one or more host computers (individual host computers not shown).

First local bus 226 can be any type of bus including but not limited to a peripheral component interconnect (PCI) bus, industry standard architecture (ISA) bus, extended industry standard architecture (EISA) bus, Micro channel architecture, SCSI bus, universal serial bus (USB), fiber channel, firewire (IEEE 1394), and the like.

Processor 210 is also coupled across second local bus 212 to one or more other I/O interfaces, such as, for example, I/O interfaces 214, 216, and 218. Such other I/O interfaces are known. Second local bus 212 can be any type of bus including but not limited to a peripheral component interconnect (PCI) bus, industry standard architecture (ISA) bus, extended industry standard architecture (EISA) bus, Micro channel architecture, SCSI bus, universal serial bus (USB), fiber channel, firewire (IEEE 1394), and the like.

I/O interfaces 214,216, and 218 each respectively provide a bridge to a respective different component bus, for example, second component bus 220, third component bus 222, and fourth component bus 224. Such I/O interfaces are known. Each respective different component bus can be, for example, an optical fiber, copper coax cable, or twisted pair (wire) bus. Each respective different component bus is coupled to a respective plurality of disk storage devices (individual disk storage devices are not shown).

Processor 210 is operatively coupled across first local bus 226 to RAM memory 232, which may be either internal or external to controller 208. The structure and operation of memory 232 may be used in conjunction with any one or more of memory 178–180 as illustrated in the embodiments of FIG. 2.

Processor 210 stores data in data 234, for example, system configuration data structures 238, for storing, by processor 210, a reserve/release synchronization data structure 238, and system configuration data structure 188-X (see also, FIG. 2). Reserve/release synchronization data structure 238 is discussed in greater detail below in reference to FIG. 5. The purpose and use of system configuration data structure 188-X is discussed in greater detail above in reference to FIG. 3.

As noted above, a reserve command from a controller 208 to a device can fail if the device has already been reserved by a different controller 208. The optional time stamp 244

Processor 210 executes procedures in code 236, for example, semaphore locking procedure 194 (see FIGS. 3 and 4), for preventing multiple controllers from simultaneously modifying respective system configuration data structures 238. Semaphore locking procedure 194 is discussed in greater detail above in reference to FIG. 3.

In a preferred embodiment:(a) controller 208 is a DAC960 series RAID controller with firmware modifications made according to the structure and method of this disclosure, for synchronizing modifications by a controller to its system configuration (DAC960 series RAID controllers are made by Mylex™ of Fremont, Calif.); (b) processor 210 is a 32-bit Intel i960 RISC microprocessor with multi-tasking functionality; (c) RAM memory 232 is random access memory; (d) first local bus 226 and second local bus 212 are PCI buses; (e) I/O interface 214 is a Qlogic ISP 2100 PCI to Fibre Channel Intelligent SCSI Processor; and, (g) I/O interfaces 214, 216 and 218 are Symbios 53c896 PCI to Ultra2 SCSI Processors.

D. Software Data Structure Level Architecture

Figure 5:
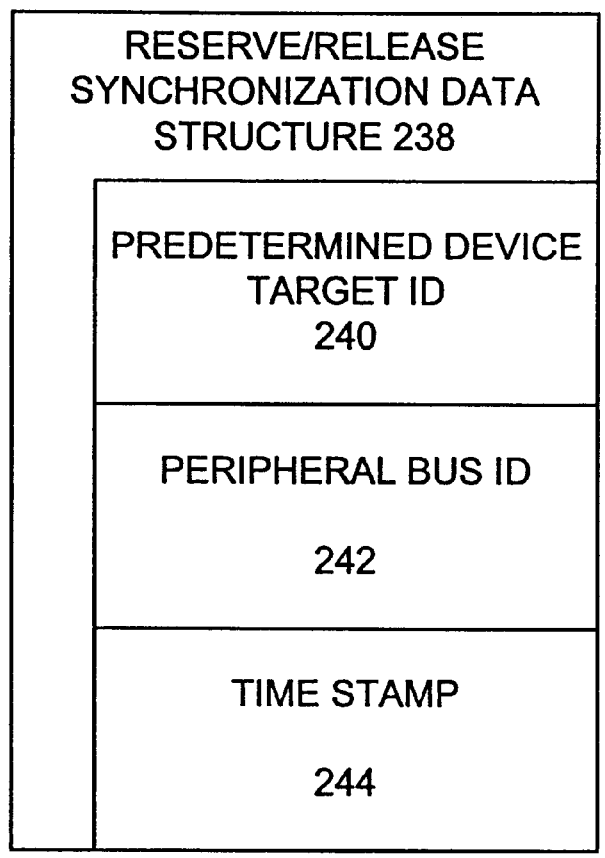

Referring to FIG. 5, there is shown a block diagram illustrating aspects of an exemplary reserve/release data structure 238, according to one embodiment of the present invention. Each controller 208 (see FIG. 4) maintains a respective reserve/release data structure 238 in memory 232. It can be appreciated that reserve/release data structure 238 could also be stored by a controller 208 onto an external disk storage device 166–170 (see FIG. 2).

Reserve/release synchronization data structure 238 is used by controller 208 to maintain: (a) the target ID 240 of the predetermined device to reserve; (b) in the instance that more that one peripheral bus is connected between the controller 208 and a plurality of storage devices, a peripheral bus identification 242, to identify the particular bus with which to send a reserve or release message to the predetermined device; and, (c) an optional time stamp 244, for maintaining by a controller 208 a time stamp that indicates when a reserve command fails.

In one embodiment, time stamp 244 is used by a controller 208 to indicate a time that a particular reserve command direct to reserve the predetermined device fails. As noted above, a reserve command can fail if another controller 208 has already reserved the predetermined device. In this embodiment, the time stamp 244 is used to enforce a fixed delay before the controller to await attempt to reserve the disk device again. This fixed delay prevents a controller 208 from constantly attempting to reserve the predetermined device while the other controller 208 is updating the system configuration 239. In one embodiment, this fixed delay is at least 100 milliseconds, but less than 5000 milliseconds, but preferably 200 milliseconds.

E. Computer Program Product

The method of semaphore locking procedure 194 described above in reference to FIG. 3 is amenable for execution on various types of executable mediums other than a memory device such as a random access memory. Other types of executable mediums can be used, such as but not limited to, a computer readable storage medium which can be any memory device, compact disc, or floppy disk.

F. Alternate Embodiments

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following Claims and their equivalents.

I claim:

1. A method for ensuring system configuration data structure coherency across multiple controllers in a data storage system, the method comprising:

detecting, by a first controller, a change in the system configuration of the data storage system;

reserving, by the first controller, a predetermined device, such that the predetermined device once reserved cannot be reserved by any other controller, and such that updates to any one controller's respective system configuration data structure can only be made if the predetermined device is reserved;

modifying, by the first controller, its respective system configuration data structure to include the change;

notifying, by the first controller, at least one other controller of the change; and, in response to the notifying, updating, by the at least one other controller, its respective system configuration data structure to include the change, the updates to each respective controller's system configuration data structure being synchronized such that each respective system configuration data structure accurately represents any change to the system configuration of the data storage system.

2. The method of claim 1, further comprising, after the updating, un-reserving, by the first controller, the predetermined device, such that any other device may reserve the particular data storage device.

3. The method of claim 1, wherein the predetermined device is a data storage device.

4. The method of claim 1, wherein the detecting, reserving, modifying, and notifying, each controller is a RAID controller.

5. The method of claim 1, wherein the reserving includes sending the predetermined device a SCSI reserve command.

6. The method of claim 2, wherein the un-reserving includes forwarding the predetermined device a SCSI release command.

7. A computer program product for ensuring system configuration data structure coherency across multiple controllers in a data storage system, the computer program product comprising a computer readable storage medium and a computer program mechanism embedded therein, the computer program mechanism comprising:

a semaphore locking program module for synchronizing modifications by a first controller to its respective system configuration data structure, and for synchronizing modifications by other controllers to their respective system configuration data structures, the program module including instructions for:

detecting, by a first controller, a change in the system configuration of the data storage system;

reserving, by the first controller, a predetermined device, such that the predetermined device once reserved cannot be reserved by any other controller;

modifying, by the first controller, its respective system configuration data structure to include the change;

notifying, by the first controller, at least one other controller of the change; and, in response to the notifying, updating, by the at least one other controller, its respective system configuration data structure to include the change, the updates to each respective controller's system configuration data structure being synchronized such that each respective system configuration data structure accurately represents any change to the system configuration of the data storage system.

8. The computer program product of claim 7, further comprising instructions for un-reserving the predetermined device by the first controller after the updating, such that any other device may reserve the particular predetermined device.

9. The computer program product of claim 7, wherein the predetermined device is a data storage device.

10. The computer program product of claim 7, wherein the instructions for detecting, reserving, modifying, and notifying, each controller are executed within a RAID controller.

11. The computer program product of claim 7, wherein the instruction for reserving includes an instruction for sending the predetermined device a SCSI reserve command.

12. The computer program product of claim 7, wherein the instructions for un-reserving includes an instructions for forwarding the predetermined device a SCSI release command.

13. An disk array controller for ensuring system configuration data structure coherency across multiple controllers in a data storage system, the disk array controller comprising:

a memory having a system configuration data structure, a reserve/release synchronization data structure, and a semaphore locking procedure stored therein, the system configuration data structure including structural, operating status, and relationship information for at least a subset of the components of the data storage system, the reserve/release data structure including identification of a predetermined device, the semaphore locking procedure using the information in the reserve/release command data structure to reserve the predetermined device before: (a) making any modifications to the system configuration data structure that reflect a change in the system configuration of the data storage system; and, (b) notifying any other components in the data storage system of the change; and, a processing unit coupled to the memory, for executing the semaphore locking procedure.

14. The disk array controller of claim 13, wherein the disk array controller is a RAID controller.

15. The disk array controller of claim 13, wherein the predetermined device is data storage device.

16. The disk array controller of claim 13, wherein the reserve/release data structure includes a peripheral bus identification, and a timestamp, the peripheral bus identification for determining which of multiple peripheral busses to use to communicate with the predetermined device, the timestamp, for setting to a time that an attempt to reserve the predetermined device was made, any subsequent attempts to reserve the predetermined device only being made at a predetermined time interval from the timestamp.

17. The disk array controller of claim 13, wherein the semaphore locking procedure uses a SCSI release command to reserve the predetermined device.

18. The disk array controller of claim 13, wherein the semaphore locking procedure un-reserves the predetermined device after making modifications to its respective system configuration data structure, and after notifying any other disk array controllers in the data storage system of the change.

19. The disk array controller of claim 13, wherein the disk array controller uses a SCSI release command to release its respective reservation on the predetermined device.

20. A computer system comprising:

a host computer;

a data storage subsystem including a plurality of data storage devices configured as an array and coupled with said host computer;

a plurality of storage device array controllers for ensuring configuration data structure coherency across said plurality of controllers, each storage device controller including: a memory having a configuration data structure, a device reserve/release synchronization data structure, and a semaphore locking procedure stored therein; the system configuration data structure including information for at least a subset of the data storage storage devices; the reserve/release data structure including identification of a predetermined device, the semaphore locking procedure using the information in the reserve/release command data structure to reserve the predetermined device before: modifying the configuration data structure and, notifying any other device in the data storage system of the change; and, a processing unit coupled to the memory, for executing the semaphore locking procedure.

21. The system of claim 20, wherein said plurality of data storage devices comprise at least one RAID.

22. The system of claim 21, wherein each storage device controller comprises a RAID controller.

23. The system of claim 20, wherein the reserve/release data structure includes a peripheral bus identification, and a timestamp, the peripheral bus identification for determining which of multiple peripheral busses to use to communicate with the predetermined device, the timestamp, for setting to a time that an attempt to reserve the predetermined device was made, any subsequent attempts to reserve the predetermined device only being made at a predetermined time interval from the timestamp.

24. The system of claim 23, wherein the semaphore locking procedure uses a SCSI release command to reserve the predetermined device.

25. The system of claim 24, wherein the semaphore locking procedure un-reserves the predetermined device after making modifications to its respective system configuration data structure, and after notifying any other disk array controllers in the data storage system of the change.

26. The system of claim 25, wherein the disk array controller uses a SCSI release command to release its respective reservation on the predetermined device.

* * * * *